UNITED STATES PATENT OFFICE.

MAX COHN, OF BERLIN, GERMANY.

PROCESS OF MANUFACTURING IODIN PREPARATIONS.

SPECIFICATION forming part of Letters Patent No. 694,945, dated March 11, 1902.

Application filed August 17, 1901. Serial No. 72,361. (No specimens.)

*To all whom it may concern:*

Be it known that I, MAX COHN, a subject of the German Emperor, residing at 21 Königin Augusta Strasse, in the city of Berlin, Kingdom of Prussia, German Empire, have invented a certain new and useful Process for the Manufacture of Iodin Preparations, of which the following is a specification.

The strong antiseptic properties of iodoform are well known, the effect being due to the iodin separating off from this compound as soon as it comes in contact with the suppurating wound, the pus being absorbed by the preparation. The antiseptic properties of iodoform are due exclusively to the iodin in a nascent state, while the undecomposed preparation has no antiseptic properties. In spite of this excellent quality the use of iodoform has not met with favor generally in consequence of its very strong, prominent, and disagreeable odor. In some cases the iodoform has therefore been even replaced by other remedies of inferior therapeutic properties.

This invention has reference to a process by means of which I am enabled to manufacture an antiseptic iodin preparation in which the iodin operates similarly to the iodin contained in iodoform without possessing the nasty odor of the latter. This object is attained by combining iodin with gelatin.

I am aware that it is old to combine iodin with tannic acid and to use such preparation as a substitute for iodid of potash. In this tannin preparation the iodin being combined with organic constituents cannot be eliminated without destroying the molecule. The preparation referred to is obtained by precipitation of glue with tannin or alcohol, respectively. The preparation obtained by my process, however, differs entirely from the old product, inasmuch as chemical combination of the iodin with the gelatin should be avoided, only a mechanical combination of the iodin with the other constituents being intended. This object of a mechanical combination is obtained by using the drying process for the manufacture of the preparation instead of resorting to precipitation by alcohol or glue, as in the previous process.

In order to carry out my invention, I may, for instance, take three parts of iodid of potash and one hundred parts of gelatin and dissolve the same in one thousand parts of distilled water. Then iodin vapors to the amount of one and one-half (1½) parts are introduced into the liquid and then some agent to harden or solidify the preparation—such as, for instance, one per cent. of chromic alum. After the gelatin mixture has cooled down it is dried on threads, then rasped or ground to a fine powder.

Instead of using iodin vapors the iodin may also be added in solution or as a solid to the gelatin solution, and it is obvious that instead of gelatin I may also use any superior grade of glue or jelly-like or similar substance.

The process may be modified by replacing the water for effecting the solution of the gelatin by a decoction or infusion of camomile or lavender.

I may of course use any desired proportions of potassium iodid, of gelatin, and of iodin. I may also make any desired additions to the new antiseptic possessing medicinal or antiseptic properties to suit various purposes.

That the iodin is not merely mechanically mixed with the gelatin, but mechanically combined therewith, is proven by the fact that the iodin in this preparation is odorless and not volatile.

The organic iodin preparations, though they have proven to be inefficient for surgical purposes, are used with success internally as an antiseptic on account of their being relatively free from poisonous properties. On the contrary, the preparation obtained by my invention is intended exclusively for external use, and by this means iodin has been reduced into a pulverulent form of easy applicability and great efficiency in surgery. Its use in surgery is depending upon the iodin being contained therein in an inodorous and non-volatile form, the combination being such that by the action of moisture the iodin is liberated and rendered operative. The action of the powdered preparation follows from its quality of absorbing moisture and only splitting off iodin thereafter. Upon being applied to suppurating wounds the pus is absorbed by the powdered gelatin iodin preparation and is directly acted upon by the splitoff iodin, which latter by its strong antiseptical properties destroys the germs and bacteria or prevents their growth.

What I claim, and desire to secure by Letters Patent of the United States, is—

The process for producing iodin preparations, containing glue and possessing antiseptic properties, which consists in dissolving potassium iodid and gelatin substances in water, adding iodin to the resultant solution, hardening or solidifying the mixture, then drying and comminuting the same.

In witness whereof I have hereunto signed my name, this 26th day of July, 1901, in the presence of two subscribing witnesses.

MAX COHN.

Witnesses:
  WOLDEMAR HAUPT,
  HENRY HASPER.